United States Patent
Zhu et al.

(10) Patent No.: US 11,553,457 B2
(45) Date of Patent: Jan. 10, 2023

(54) COORDINATION BETWEEN MULTICAST/BROADCAST COMMUNICATION AND UNICAST COMMUNICATION

(71) Applicant: QUALCOMM Incorporated, San Diego, CA (US)

(72) Inventors: Xipeng Zhu, San Diego, CA (US); Prasad Reddy Kadiri, San Diego, CA (US); Alberto Rico Alvarino, San Diego, CA (US); Gavin Bernard Horn, La Jolla, CA (US); Umesh Phuyal, San Diego, CA (US); Miguel Griot, La Jolla, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 17/071,354

(22) Filed: Oct. 15, 2020

(65) Prior Publication Data

US 2021/0120526 A1 Apr. 22, 2021

Related U.S. Application Data

(60) Provisional application No. 62/923,283, filed on Oct. 18, 2019.

(51) Int. Cl.
*H04W 72/00* (2009.01)
*H04W 72/04* (2009.01)
(Continued)

(52) U.S. Cl.
CPC ....... *H04W 72/005* (2013.01); *H04W 72/042* (2013.01); *H04W 72/0466* (2013.01);
(Continued)

(58) Field of Classification Search
CPC ............ H04W 72/005; H04W 72/042; H04W 72/0466; H04W 76/11; H04W 80/02;
(Continued)

(56) References Cited

U.S. PATENT DOCUMENTS

2011/0154421 A1* 6/2011 Chun ............... H04N 21/25808
725/109
2011/0299448 A1* 12/2011 Meier ................ H04N 21/4402
370/312

(Continued)

OTHER PUBLICATIONS

3GPP SA WG2 Meeting #100; S2-134055; Source: Samsung ; Title: Group communications with early E-RAB establishment; Nov. 11-15, 2013, San Francisco, USA; (Year: 2013).*

(Continued)

*Primary Examiner* — Mohammed S Chowdhury
(74) *Attorney, Agent, or Firm* — Harrity & Harrity, LLP; Kevin M. Donnelly

(57) ABSTRACT

Various aspects of the present disclosure generally relate to wireless communication. In some aspects, a user equipment (UE) may receive a configuration for a shared physical downlink shared channel (PDSCH). The UE may receive a first communication via the shared PDSCH and a first bearer based at least in part on the configuration, the first communication being one of a unicast communication or a multicast/broadcast communication. The UE may receive a second communication via the shared PDSCH and the first bearer or a second bearer based at least in part on the configuration, the second communication being the other of the unicast communication or the multicast/broadcast communication. Numerous other aspects are provided.

30 Claims, 11 Drawing Sheets

(51) Int. Cl.
*H04W 80/02* (2009.01)
*H04W 80/08* (2009.01)
*H04W 76/11* (2018.01)

(52) U.S. Cl.
CPC ............ *H04W 76/11* (2018.02); *H04W 80/02* (2013.01); *H04W 80/08* (2013.01)

(58) Field of Classification Search
CPC ..... H04W 80/08; H04W 76/15; H04W 76/40; H04W 4/06; H04W 88/06; H04W 88/10
See application file for complete search history.

(56) References Cited

U.S. PATENT DOCUMENTS

| | | | | |
|---|---|---|---|---|
| 2013/0114497 | A1* | 5/2013 | Zhang | H04W 4/06 370/312 |
| 2014/0029580 | A1* | 1/2014 | Jung | H04W 36/08 370/331 |
| 2014/0112236 | A1* | 4/2014 | Jung | H04W 36/0007 370/312 |
| 2014/0153472 | A1* | 6/2014 | Phan | H04B 7/15 370/312 |
| 2014/0226552 | A1* | 8/2014 | Niu | H04L 5/0055 370/312 |
| 2014/0355493 | A1* | 12/2014 | Niu | H04L 12/189 370/280 |
| 2015/0003315 | A1 | 1/2015 | Chen et al. | |
| 2018/0049060 | A1* | 2/2018 | Fujishiro | H04W 28/06 |
| 2020/0163005 | A1* | 5/2020 | Rao | H04W 4/46 |
| 2020/0267513 | A1* | 8/2020 | Zhu | H04W 76/10 |
| 2020/0323024 | A1* | 10/2020 | Huang | H04W 76/40 |

OTHER PUBLICATIONS

IEEE:A study on single-cell point-to-multipoint transmission for public safety communications with eMBMS LTE networks. Ahmad Awada • David Navratil • Mikko Sail; Pub date: Sep. 12, 2016. (Year: 2016).*
Garro E., et al., "Broadcast and Multicast Communication Enablers for the Fifth-Generation of Wireless Systems Deliverable D3.2 Air Interface", Jul. 25, 2019 (Jul. 25, 2019), XP055766123, 98 Pages, Retrieved from the Internet: URL: http://5g-xcast.eu/wp-content/uploads/2019/07/5G-Xcast_WP3_D3.2_v3.00_web.pdf. [retrieved on Jan. 18, 2021]—abstract executive summary F93 chapters 2.3. 2.4. 3. 6. A.2 F93.
International Search Report and Written Opinion—PCT/US2020/055965—ISA/EPO—dated Jan. 28, 2021.
Joan G.J., et al., "5G New Radio for Terrestrial Broadcast: A Forward-Looking Approach for NR-MBMS", IEEE Transactions on Broadcasting, IEEE Service Center Piscataway, NJ, US, vol. 65. No. 2 Jun. 2019 (Jun. 2019), pp. 356-368. XP011727944, ISSN: 0018-9316. DOI: 10.1109/TBC.2019.2912117 [retrieved on Jun. 5, 2019] chapters II. III.
Saily M., et al., "Broadcast and Multicast Communication Enablers for the Fifth-Generation of Wireless Systems Deliverable D3.4 RAT Protocols and Radio Resource Management in 5G-Xcast", Jul. 31, 2019 (Jul. 31, 2019), XP055685218, 109 Pages, Retrieved from the Internet: URL: http://5g-xcast.eu/wp-content/uploads/2019/07/5G-Xcast_WP3_D3.4_v3.0.pdf. [retrieved on Apr. 14, 2020]—chapters 3. 4. 6.
Vargas D., et al., "Broadcast and Multicast Communication Enablers for the Fifth-Generation of Wireless Systems Deliverable D3.3 RAN Logical Architecture and Interfaces for 5G-Xcast", Feb. 28, 2019 (Feb. 28, 2019), XP055685520, 95 Pages, Retrieved from the Internet: URL: http://5g-xcast.eu/wp-content/uploads/2019/03/5G-Xcast_D3.3_v2.0_web.pdf. [retrieved on Apr. 14, 2020]—chapters 1-3. 5. 6. A.2.

* cited by examiner ns in this Patent 15
COORDINATION BETWEEN MULTICAST/BROADCAST COMMUNICATION AND UNICAST COMMUNICATION

CROSS-REFERENCE TO RELATED APPLICATION

This Patent Application claims priority to U.S. Provisional Patent Application No. 62/923,283, filed on Oct. 18, 2019, entitled "COORDINATION BETWEEN MULTICAST/BROADCAST COMMUNICATION AND UNICAST COMMUNICATION," and assigned to the assignee hereof. The disclosure of the prior Application is considered part of and is incorporated by reference in this Patent Application.

FIELD OF THE DISCLOSURE

Aspects of the present disclosure generally relate to wireless communication and specifically, to techniques and apparatuses for coordination between multicast/broadcast communication and unicast communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation.

A base station in an LTE network may send transmissions to a UE over a physical radio channel, such as a physical downlink shared channel (PDSCH). This one-to-one communication may be considered a unicast transmission. The LTE network may also use single cell point to multipoint (SC-PTM) to improve efficiency and to reduce latency. That is, an eNB may multicast or broadcast a transmission to multiple UEs. While an LTE network may only have unicast communications on the PDSCH, an NR network may have multicast/broadcast (MB) communications that share the same PDSCH as unicast communications. Because MB and unicast communications may share the same PDSCH, it is possible for the NR network to have coordination between an MB radio bearer (MRB) and a unicast dedicated radio bearer (DRB). However, this coordination may involve inefficiencies, some of which may be due to inflexible configurations. These inefficiencies may cause a gNB and UEs to waste channel, signaling and processing resources.

SUMMARY

In some aspects, a method of wireless communication performed by a user equipment (UE) includes receiving a configuration for a shared physical downlink shared channel (PDSCH). The method may include receiving a first communication via the shared PDSCH and a first bearer based at least in part on the configuration, the first communication being one of a unicast communication or a multicast/broadcast communication. The method may include receiving a second communication via the shared PDSCH and the first bearer or a second bearer based at least in part on the configuration, the second communication being the other of the unicast communication or the multicast/broadcast communication.

In some aspects, a method of wireless communication performed by a base station includes transmitting a configuration for a shared PDSCH. The method may include transmitting a first communication via the shared PDSCH and a first bearer based at least in part on the configuration, the first communication being one of a unicast communication or a multicast/broadcast communication. The method may include transmitting a second communication via the shared PDSCH and the first bearer or a second bearer based at least in part on the configuration, the second communication being the other of the unicast communication or the multicast/broadcast communication.

In some aspects, a UE for wireless communication includes a memory and one or more processors operatively coupled to the memory. The memory and the one or more processors may be configured to receive a configuration for a shared PDSCH. The memory and the one or more processors may be configured to receive a first communication via the shared PDSCH and a first bearer based at least in part on the configuration, the first communication being one of a unicast communication or a multicast/broadcast communication. The memory and the one or more processors may be configured to receive a second communication via the shared PDSCH and the first bearer or a second bearer based at least in part on the configuration, the second communication being the other of the unicast communication or the multicast/broadcast communication.

In some aspects, a base station for wireless communication includes a memory and one or more processors operatively coupled to the memory. The memory and the one or more processors may be configured to transmit a configuration for a shared PDSCH. The memory and the one or more processors may be configured to transmit a first communication via the shared PDSCH and a first bearer based at least in part on the configuration, the first communication being one of a unicast communication or a multicast/broadcast communication. The memory and the one or more processors may be configured to transmit a second communication via the shared PDSCH and the first bearer or a second bearer based at least in part on the configuration, the second communication being the other of the unicast communication or the multicast/broadcast communication.

In some aspects, a non-transitory computer-readable medium storing a set of instructions for wireless communication includes one or more instructions that, when executed by one or more processors of a UE, cause the UE to receive a configuration for a shared PDSCH. The one or more instructions may cause the UE to receive a first communication via the shared PDSCH and a first bearer based at least in part on the configuration, the first communication being one of a unicast communication or a multicast/broadcast communication. The one or more instructions may cause the UE to receive a second communication via the shared PDSCH and the first bearer or a second bearer based at least in part on the configuration, the second communication being the other of the unicast communication or the multicast/broadcast communication.

In some aspects, a non-transitory computer-readable medium storing a set of instructions for wireless communication includes one or more instructions that, when executed by one or more processors of a base station, cause the base station to transmit a configuration for a shared PDSCH. The one or more instructions may cause the base station to transmit a first communication via the shared PDSCH and a first bearer based at least in part on the configuration, the first communication being one of a unicast communication or a multicast/broadcast communication. The one or more instructions may cause the base station to transmit a second communication via the shared PDSCH and the first bearer or a second bearer based at least in part on the configuration, the second communication being the other of the unicast communication or the multicast/broadcast communication.

In some aspects, an apparatus for wireless communication includes means for receiving a configuration for a shared PDSCH. The apparatus may include means for receiving a first communication via the shared PDSCH and a first bearer based at least in part on the configuration, the first communication being one of a unicast communication or a multicast/broadcast communication. The apparatus may include means for receiving a second communication via the shared PDSCH and the first bearer or a second bearer based at least in part on the configuration, the second communication being the other of the unicast communication or the multicast/broadcast communication.

In some aspects, an apparatus for wireless communication includes means for transmitting a configuration for a shared PDSCH. The apparatus may include means for transmitting a first communication via the shared PDSCH and a first bearer based at least in part on the configuration, the first communication being one of a unicast communication or a multicast/broadcast communication. The apparatus may include means for transmitting a second communication via the shared PDSCH and the first bearer or a second bearer based at least in part on the configuration, the second communication being the other of the unicast communication or the multicast/broadcast communication.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
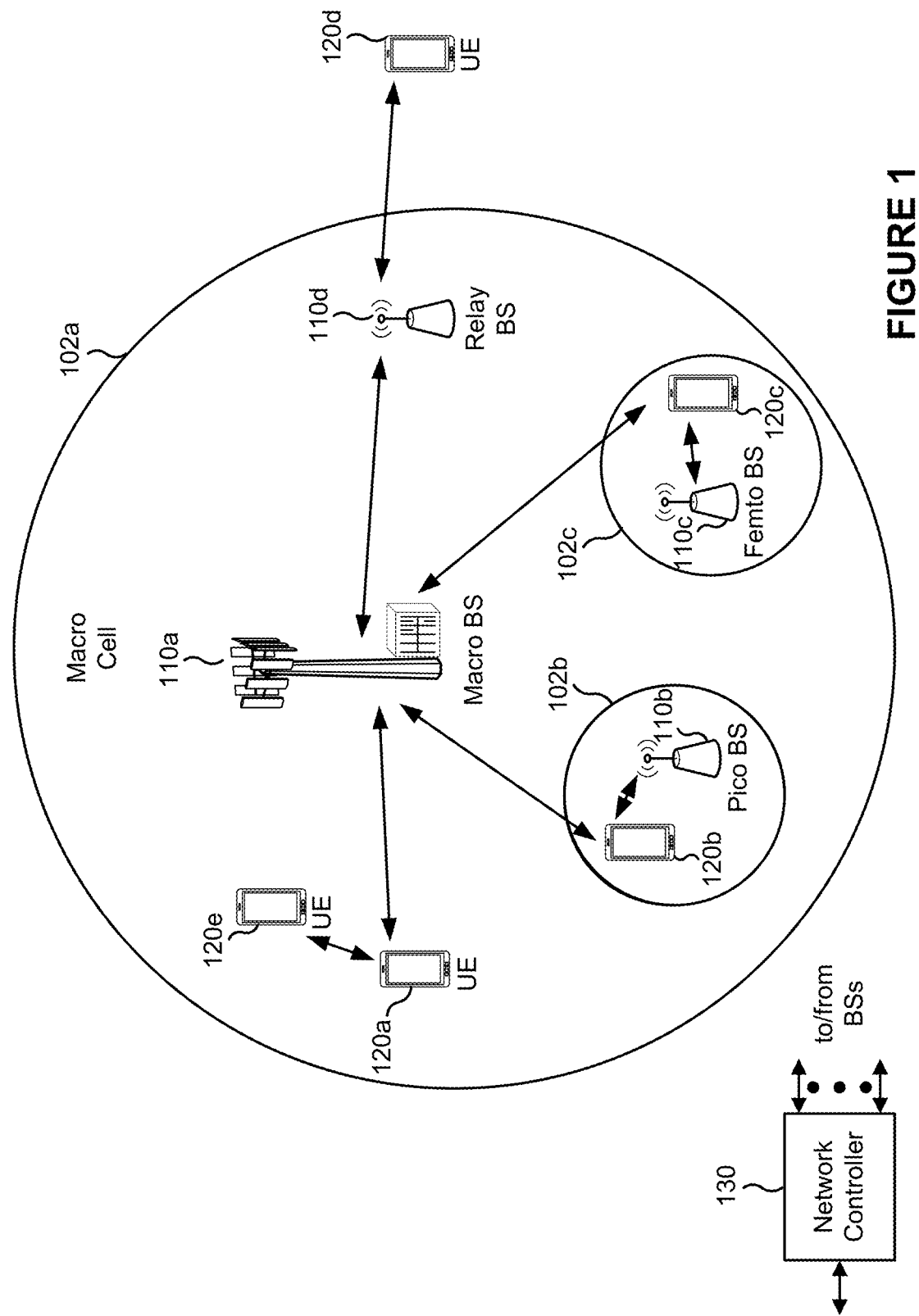
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms among other examples, or combinations thereof (collectively referred to as "elements"). These elements may be implemented using hardware, software, or combinations thereof. Whether such elements are implemented as hardware or software depends upon the particular application and design constraints imposed on the overall system.

A base station in a Long Term Evolution (LTE) network, such as an eNB, may send transmissions to a user equipment (UE) over a physical radio channel, such as a physical downlink shared channel (PDSCH). The LTE network may use a radio network temporary identifier (RNTI) to identify the radio channel from among other radio channels. For example, an eNB may schedule a unicast (one-to-one) transmission to a UE using a cell RNTI (C-RNTI). The eNB may also multicast or broadcast a transmission to multiple UEs, using a shared PDSCH. The eNB may schedule a multicast/broadcast (MB) transmission using a common RNTI, which may be a group RNTI (G-RNTI).

An NR network will support cooperation between MB communications and unicast communications. For example, MB communications and unicast communications in an NR network may share the same PDSCH, while an LTE network may only have unicast communications on the PDSCH. Because MB communications and unicast communications may share the same PDSCH in an NR network, it is possible to have coordination between an MB radio bearer (MRB) and a unicast dedicated radio bearer (DRB). However, this coordination may have inefficiencies, some of which may be due to an inflexible configuration of the MRB and the DRB. These inefficiencies may cause a gNB and UEs to waste channel, signaling, and processing resources. For example, some UEs on a cell edge may not be receiving successful transmissions via the MRB, and a gNB may not be able to switch from an MRB to a DRB. The gNB may expend extra processing and signaling resources to send additional transmissions at a later time to UEs that are not successfully receiving the transmissions via the MRB. Additionally or alternatively, a gNB may overuse a DRB during MRB/DRB coordination, which may lead to a gNB and corresponding UEs wasting channel, signaling, and processing resources. For example, the gNB may be transmitting to UEs using a DRB more frequently than necessary when an MRB may be more efficient.

In some aspects, as described herein, a base station, such as a gNB, may coordinate between MB communication and unicast communication. The base station may transmit, to a UE, a configuration for a mixed mode that uses a shared PDSCH for MB traffic and for unicast traffic, and that permits switching between a DRB and an MRB. The base station may transmit a first communication via a first bearer, the first bearer being the DRB or the MRB. The base station may identify a second bearer based at least in part on the configuration, the second bearer being the other of the DRB or the MRB. The base station may transmit a second communication via the second bearer. The UE may receive the first communication via the first bearer, identify the second bearer based at least in part on the configuration, and receive the second communication via the second bearer.

In this way, the base station and the UE are not limited to a fixed mixed mode configuration that may be inefficient. The base station may determine the configuration and signal it to the UE. The UE may provide feedback to aid the base station in selecting the configuration. The base station and the UE may thus avoid wasting channel, signaling, and processing resources that would be spent accounting for inefficiencies in the coordination. For example, when a maximum bit rate is sufficient, a base station may determine that transmissions to UEs are using a DRB more than necessary. In such instances, the base station and the UE may be able to switch from a DRB to an MRB. Additionally or alternatively, the base station may save processing and signaling resources that would otherwise be spent sending additional transmissions at a later time to UEs that are not successfully receiving the transmissions via broadcast.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), or a transmit receive point (TRP) among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, or location tags among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband interne of things) devices. Some UEs may be considered a Customer Premises Equipment (CPE). UE 120 may be included inside a housing that houses components of UE 120, such as processor components, or memory components among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol among other examples, or combinations thereof), a mesh network among other examples, or combinations thereof. In such examples, the UE 120 may perform scheduling operations, resource selection operations, or other operations described elsewhere herein as being performed by the base station 110.

Figure 2:
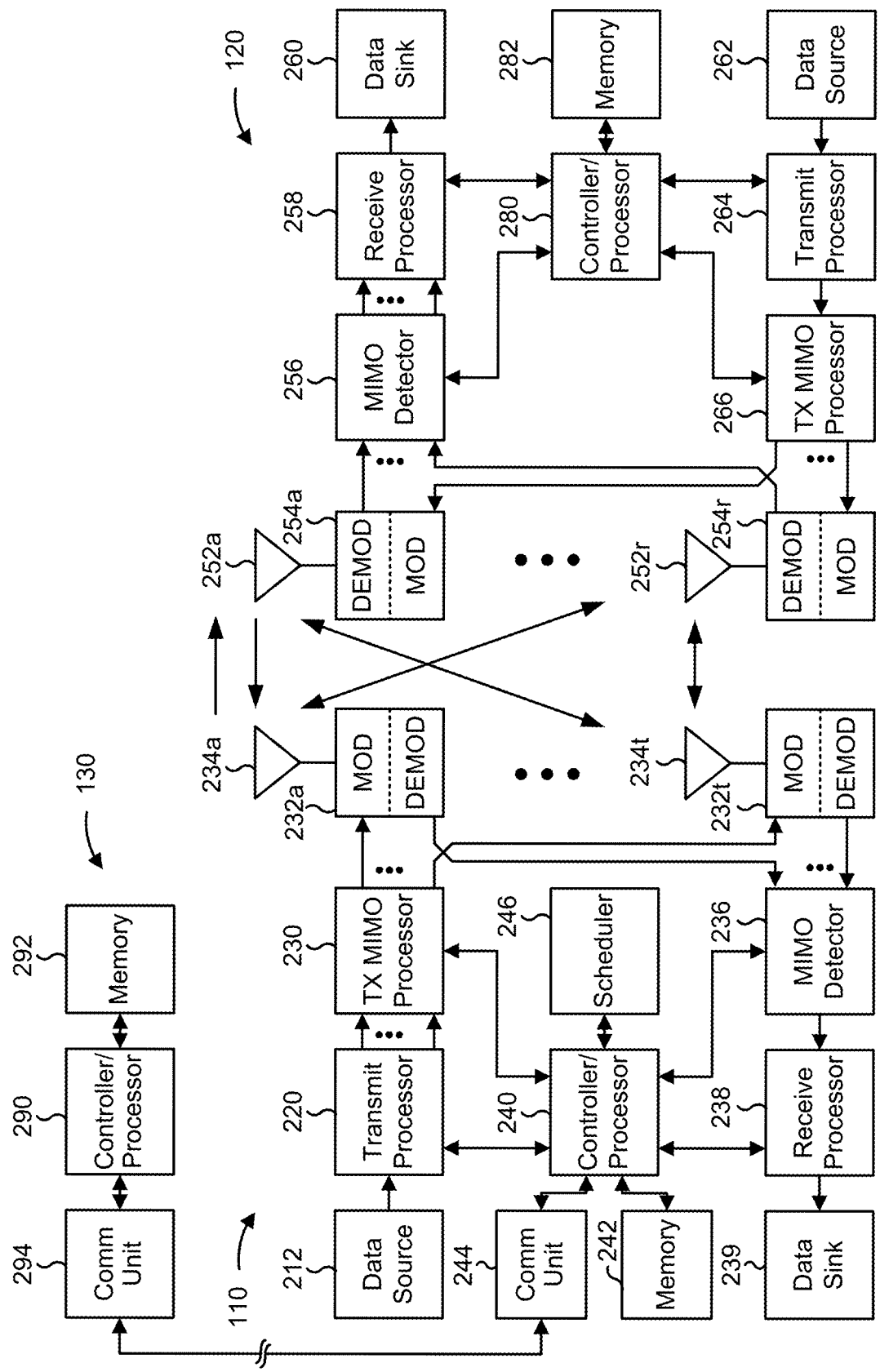
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232*t*. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232*a* through 232*t* may be transmitted via T antennas 234*a* through 234*t*, respectively. In accordance with various aspects described in more detail below, the synchronization signals can be generated with location encoding to convey additional information.

At UE 120, antennas 252*a* through 252*r* may receive the downlink signals from base station 110 or other base stations and may provide received signals to R demodulators (DE-MODs) 254*a* through 254*r*, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254*a* through 254*r*, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI) among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254*a* through 254*r* (for example, for discrete Fourier transform spread orthogonal frequency division multiplexing (DFT-s-OFDM), orthogonal frequency division multiplexing (OFDM) with a cyclic prefix (CP) (CP-OFDM) among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with coordination between multicast/broadcast communication and unicast communication as described in more detail elsewhere herein. For example, controller/processor 240 of base station 110, controller/processor 280 of UE 120, or any other component(s) of FIG. 2 may perform or direct operations of, for example, process 800 of FIG. 8, process 900 of FIG. 9, or other processes as described herein. Memories 242 and 282 may store data and program codes for base station 110 and UE 120, respectively. A scheduler 246 may schedule UEs for data transmission on the downlink or uplink.

In some aspects, the UE includes means for receiving a configuration for a shared physical downlink shared channel (PDSCH); means for receiving a first communication via the shared PDSCH and a first bearer based at least in part on the configuration, the first communication being one of a unicast communication or a multicast/broadcast communication; means for receiving a second communication via the shared PDSCH and the first bearer or a second bearer based at least in part on the configuration, the second communication being the other of the unicast communication or the multicast/broadcast communication; or a combination thereof. In some aspects, the UE includes means for transmitting uplink feedback, associated with at least one of the first communication or the second communication, using a cell radio network temporary identifier. The means for the UE to perform operations described herein may include, for example, antenna 252, demodulator 254, MIMO detector 256, receive processor 258, transmit processor 264, TX MIMO processor 266, modulator 254, controller/processor 280, memory 282, or a combination thereof.

In some aspects, the base station includes means for transmitting a configuration for a shared PDSCH; means for transmitting a first communication via the shared PDSCH and a first bearer based at least in part on the configuration, the first communication being one of a unicast communication or a multicast/broadcast communication; means for transmitting a second communication via the shared PDSCH and the first bearer or a second bearer based at least in part on the configuration, the second communication being the other of the unicast communication or the multicast/broadcast communication; or a combination thereof. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station includes means for dynamically scheduling packets over the first physical layer, the second physical layer, or both. In some aspects, the base station includes means for transmitting a different configuration based at least in part on the uplink feedback. In some aspects, the base station includes means for dynamically switching between the first bearer and the second bearer, wherein the first bearer is one of a multicast broadcast radio bearer (MRB) or a dedicated radio bearer (DRB), and wherein the second bearer is the other of the MRB or the DRB. In some aspects, the base station includes means for assigning a sequence number, to a communication transmitted after the switching, that continues from a sequence number used for a communication transmitted before the switching.

Figure 3:
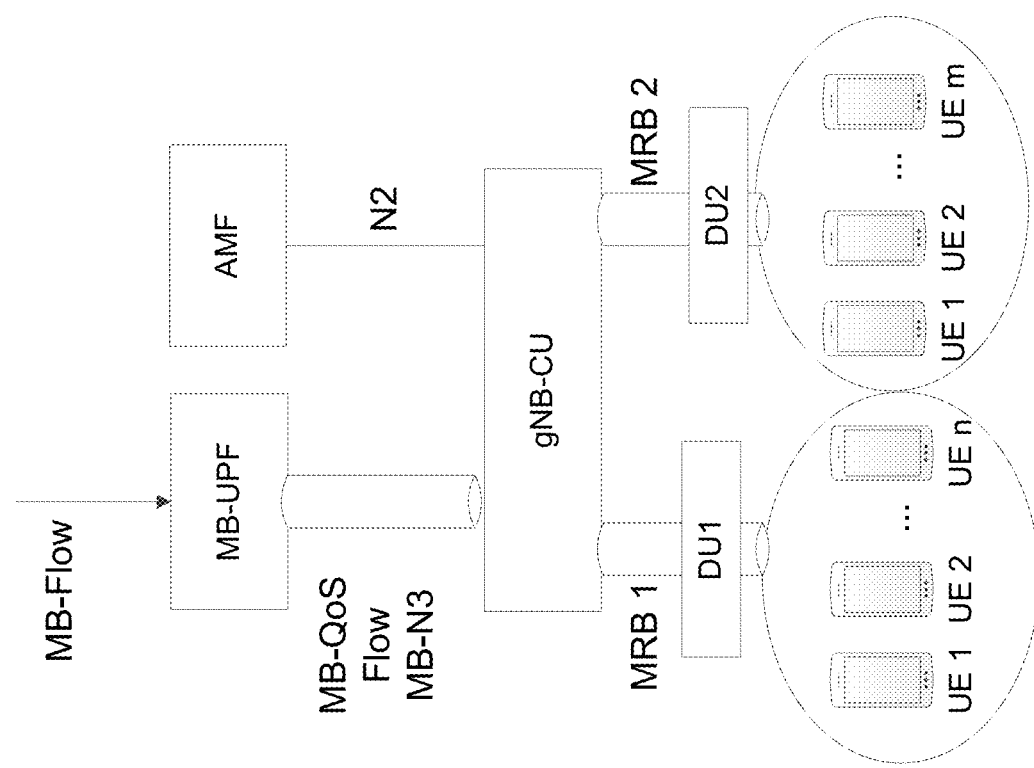
FIG. 3 is a block diagram illustrating a logical architecture of a distributed radio access network (RAN) in accordance with various aspects of the present disclosure.

FIG. 3 is a block diagram illustrating a logical architecture of a distributed radio access network (RAN) in accordance with various aspects of the present disclosure. One or more entities of a 5G network may have a multicast/broadcast (MB) user plane function (MB-UPF) and an access and mobility function (AMF). The MB-UPF may have an N3 interface for delivering an MB-flow of packets (for example, in the form of protocol data units (PDUs)) to a 5G access node, such as a gNB. The AMF may control signaling for MB-flow setup and modification using an N2 interface to the gNB.

The gNB may include a central unit (CU), indicated as gNB-CU. The gNB may also include one or more distributed units (DUs), indicated as DU1 and DU2. DU1 and DU2 may be configured to individually (for example, via dynamic selection) or jointly (for example, via joint transmission) serve traffic to a UE. As shown, DU1 may serve traffic using MRB1 and DU2 may server traffic using MRB2.

Figure 4:
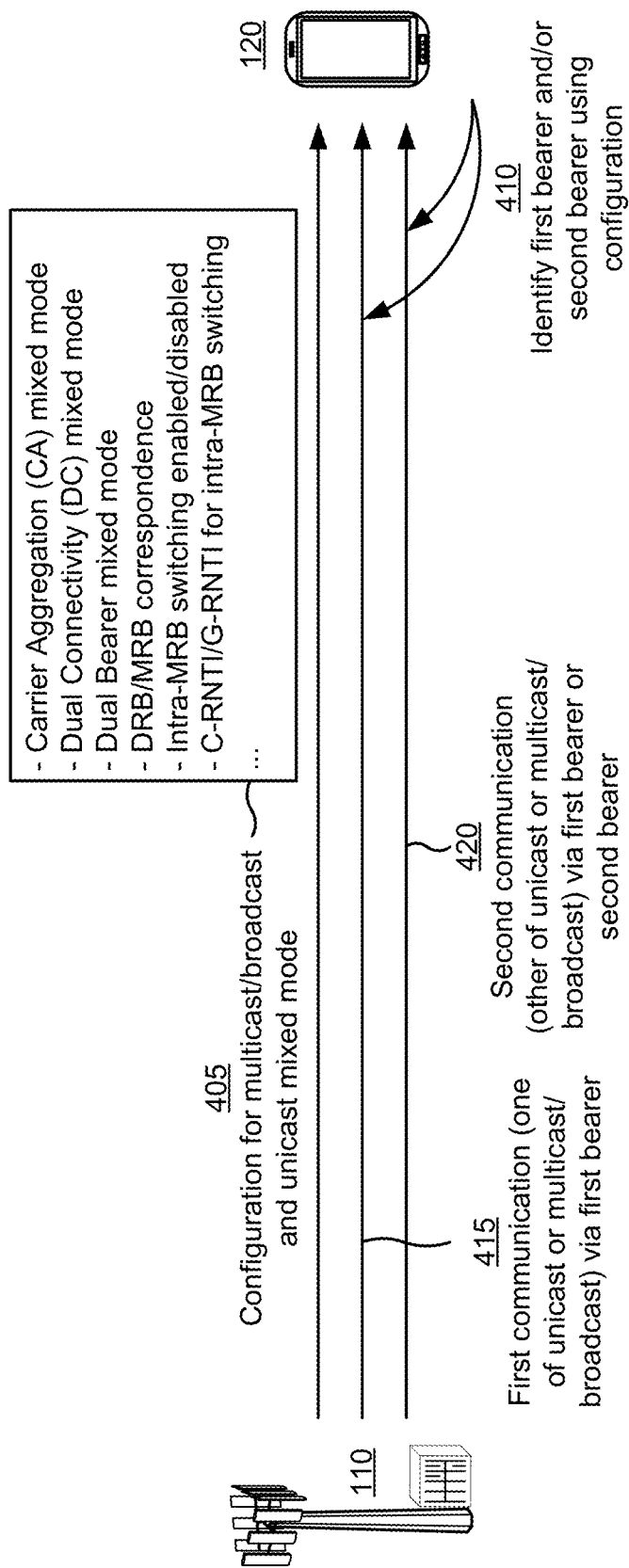
FIG. 4 is a diagram illustrating coordination between multicast/broadcast (MB) communication and unicast communication.

FIG. 4 is a diagram illustrating coordination between MB communication and unicast communication. At a first operation 405, a base station 110, such as a gNB, may send a configuration for MB and unicast mixed mode to a UE 120. The configuration may indicate a mixed mode of operation for MB and unicast. The mixed mode may use a shared PDSCH for MB traffic and for unicast traffic and permit switching between a DRB and an MRB. Additionally or alternatively, the mixed mode may permit intra-MRB switching, such as switching between unicast communications and multicast/broadcast communications on the same MRB. In some aspects, the configuration may enable or disable intra-MRB switching. Additionally or alternatively, the configuration may indicate a C-RNTI to be used for unicast communications on an MRB and a G-RNTI to be used for multicast/broadcast communications on the same MRB. The configuration may include information for a carrier aggregation (CA) mixed mode, a dual connectivity (DC) mixed mode, a dual bearer (MRB and DRB) mixed mode, information about DRB/MRB correspondence, information indicating whether intra-MRB switching is enabled or disabled, information indicating whether DRB/MRB switching is enabled or disabled, information indicating a C-RNTI for unicast communications, information indicating a G-RNTI for multicast/broadcast communications, or any combination thereof.

At a second operation 410, UE 120 may identify a first bearer, a second bearer, or both, using the configuration. Base station 110 may send a first communication 415 via a DRB or an MRB and send a second communication 420 via the other of the DRB or the MRB. The first communication 415 may be one of a unicast communication or a multicast/broadcast communication, and the second communication 420 may be the other of the unicast communication or the multicast/broadcast communication. In some aspects, base station 110 may have flexibility to switch between a DRB and an MRB. Additionally or alternatively, for intra-MRB switching, the base station 110 may send the first communication 415 via an MRB and may also send the second communication 420 via the MRB. For example, the base station 110 may send a unicast communication (as the first communication 415) via the MRB and may then send a multicast/broadcast communication (as the second communication 420) via the same MRB. As another example, the base station 110 may send a multicast/broadcast communication (as the first communication 415) via the MRB and may then send a unicast communication (as the second communication 420) via the same MRB. A communication (the first communication 415 or the second communication 420) may be scrambled and descrambled with a C-RNTI (for example, indicated in the configuration) when the communication is a unicast communication. A communication (the first communication 415 or the second communication 420) may be scrambled and descrambled with a G-RNTI (for example, indicated in the configuration) when the communication is a multicast/broadcast communication.

As shown, the base station 110 may send the first communication 415 via a first bearer and may send the second communication 420 via the first bearer or a second bearer. For example, for DRB/MRB switching, the base station 110 transmits the first communication 415 via the first bearer (which is one of a DRB or an MRB) and transmits the second communication 420 via the second bearer (which is the other of the DRB or the MRB). For intra-MRB switching, the base station 110 transmits the first communication 415 via the first bearer (which is an MRB) and also transmits the second communication 420 via the first bearer (which is the same MRB). In either case, the first communication 415 and the second communication 420 may be scrambled and descrambled using different RNTIs. For example, the first communication 415 may be scrambled and descrambled using a first RNTI (one of a C-RNTI or a G-RNTI), and the second communication 420 may be scrambled and descrambled using a second RNTI (the other of the C-RNTI or the G-RNTI). The configuration may indicate the RNTIs to be used for scrambling the first communication 415 and the second communication 420.

Base station 110 may use RNTIs to identify channels for transmissions. Base station 110 may send original data using a G-RNTI and send retransmissions using the G-RNTI and a C-RNTI. Additionally or alternatively, base station 110 may send data in parallel using a G-RNTI and a C-RNTI. Base station 110 may bi-cast original data using the G-RNTI and the C-RNTI. This is similar to duplication transmission involved with DC.

In some aspects, base station 110 may send a redundant transmission using a C-RNTI. For example, base station 110 may broadcast original data using a G-RNTI and send a redundant version using the C-RNTI. UE 120 may combine data using the G-RNTI and the C-RNTI, for example, using soft-combining that combines pieces of insufficient information together so that a total signal may be decoded. Such redundancy may be used for UEs at an edge of a cell, because a signal-to-noise ratio (SNR) may not be as high at an edge of a cell. This redundancy may be used without being triggered by UE feedback.

In some aspects, base station 110 may layer transmissions, such as for video. For example, base station 110 may use basic transmission layers using a G-RNTI and use enhancement layers using a C-RNTI. Alternatively, base station 110 may use basic transmission layers using a C-RNTI and use enhancement layers using a G-RNTI. A higher layer may have an indication of bits that base station 110 may use to differentiate between PDUs for a basic transmission layer and PDUs for an enhancement layer. Base station 110 may, for example, inspect a general packet radio service (GPRS) tunneling protocol (GTP) header to identify the bits. Additionally or alternatively, base station 110 may use basic transmissions with G-RNTI and add in enhancement layers using C-RNTI. Base station 110 may enforce a quality of service (QoS). A GTP header may include information for a QoS flow ID and thus base station 110 may know to which QoS-flow a layer belongs. In some aspects, base station 110 may determine an upper bound of a basic layer's data rate per guaranteed bit rate (GBR) IE in a QoS profile. Base station 110 may configure a maximum bitrate of a combined MB communication and unicast communication per a maximum bit rate (MBR) IE in the QoS profile.

Figure 5:
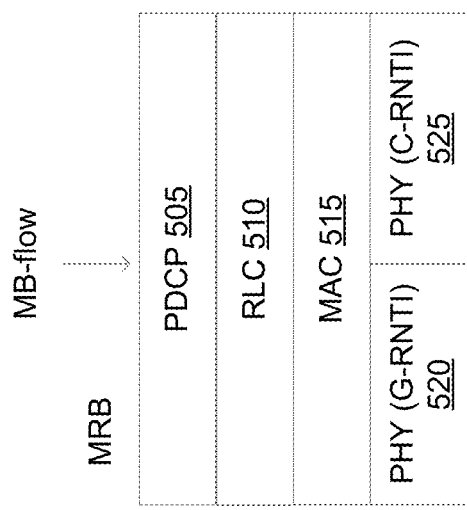
FIG. 5 illustrates network protocol layers for a multicast/broadcast (MB)-flow in a carrier aggregation (CA) mixed mode for coordination between MB communication and unicast communication in accordance with various aspects of the present disclosure.

FIG. 5 illustrates network protocol layers for an MB-flow in a CA mixed mode for coordination between MB communication and unicast communication in accordance with various aspects of the present disclosure. Protocol layers for an MRB in CA mixed mode may include a single packet data convergence protocol (PDCP) layer 505 for both MB traffic and unicast traffic, a single radio link control (RLC) layer 510 for both MB traffic and unicast traffic, a single medium access control (MAC) layer 515 for both MB traffic and unicast traffic, and two physical (PHY) layers 520 and 525. One physical layer 520 may be for MB traffic and one physical layer 525 may be for unicast traffic. That is, a base station, such as base station 110, may use dual RNTI (G-RNTI and C-RNTI) in a shared MAC protocol layer.

In some aspects, a base station may schedule data dynamically, using downlink control information (DCI), for example, on different carriers or on the same carrier with a different RNTI. The base station may dynamically schedule each MAC PDU using the G-RNTI, the C-RNTI, or both. The base station may dynamically schedule each MAC PDU based at least in part on channel state information (CSI) of a UE, a quantity of receiving UEs, QoS requirements (for example, delay or packet error rate (PER)), or a combination thereof.

Additionally or alternatively, UE 120 may provide feedback for unicast assistance. UE 120 may transmit feedback using a C-RNTI using, for example, CSI feedback, hybrid automatic repeat request (HARQ) ACK/NACK, an RLC status report, or a PDCP status report. UE 120 may include, in a status report, an MRB-ID, a G-RNTI, or a unique logical channel ID (LCID) for the base station to identify a corresponding MRB. A HARQ retransmission may be on either an MRB or a DRB.

Figure 6:
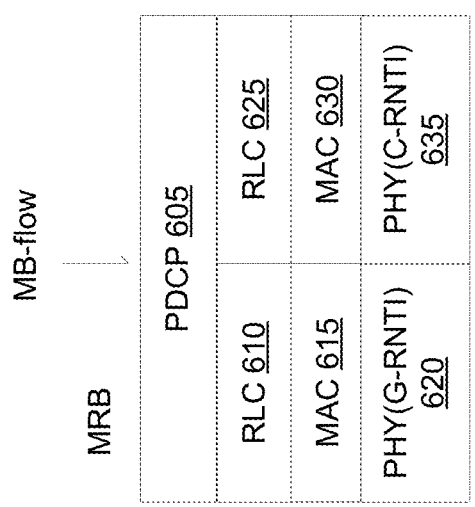
FIG. 6 illustrates network protocol layers for an MB-flow in a dual connectivity (DC) mixed mode for coordination between MB communication and unicast communication in accordance with various aspects of the present disclosure.

FIG. 6 illustrates network protocol layers for an MB-flow in a DC mixed mode for coordination between MB communication and unicast communication in accordance with various aspects of the present disclosure. A base station, such as base station 110, may provide an MB-flow using dual RLCs that share a PDCP layer. For example, a configuration for DC mixed mode may include a single PDCP layer 605 for both the MB traffic and the unicast traffic, a first RLC layer 610 associated with a first MAC layer 615 and a first physical (PHY) layer 620 for the MB traffic, and a second RLC layer 625 associated with a second MAC layer 630 and a second physical layer 635 for the unicast traffic.

In a distributed RAN, a physical layer may be supported in a radio unit (RU) or a distributed unit (DU) by dedicated hardware in a base station, and it may be difficult to upgrade this hardware. PDCP is supported in a central unit (CU) of a base station, and the CU may use PDCP based unicast/broadcast selection and achieve considerable gain with unicast/broadcast coordination. A base station may use the PDCP layer with its general purpose hardware and unicast/broadcast cooperation may be implemented without upgrading hardware of the base station. Note that although the CA mixed mode may provide tighter MB and unicast coordination on a shared channel in a MAC layer than for the DC mixed mode, the base station dedicated hardware may not need to be upgraded to use the DC mixed mode with a shared PDCP channel, and so the DC mixed mode may be more useful in some examples.

In some aspects, a base station may determine to transmit duplicate PDUs on both RLC layers for duplication. The base station may configure a UE-specific unicast RLC layer for an MRB. For an incoming packet or PDU, the base station may dynamically select to transmit by a broadcast (G-RNTI) RLC layer only, by a unicast (C-RNTI) RLC layer only, or by both RLC layers (such as for duplication). In some aspects, a base station may decide whether to transmit by the broadcast RLC layer, the unicast RLC layer, or by both RLC layers based at least in part on, for example, a quantity of receiving UEs. If a quantity of UEs in communication with the base station does not satisfy a threshold quantity, the base station may use a unicast RLC layer. Additionally or alternatively, the base station may select which RLC layers to use based at least in part on channel state information (CSI) from UEs in communication with the base station. Broadcast coverage is generally smaller than unicast coverage so if a coverage area does not satisfy a threshold size, CSI may indicate, via UE feedback, a degradation at a cell edge. UEs at a cell center may receive broadcast transmissions, and UEs at a cell edge may receive an additional unicast transmission. Additionally or alternatively, a base station may select which RLC layers to use based at least in part on an RLC receiving status and link status. If a quantity of UEs reporting NACK satisfies a threshold, the base station may use MB for retransmission. If the quantity of UEs does not satisfy a threshold, the base station may use unicast for the UEs that are reporting NACK.

In some aspects, for either the CA mixed mode or the DC mixed mode, a base station may determine if a QoS or a data packet rate may be met using MB or unicast. For example, the base station may use a packet error rate (PER) requirement to determine whether to use MB or unicast. In some other aspects, a base station may decide to use MB or unicast based at least in part on communication conditions and a timeout period. For example, if the base station has spent 100 ms for transmission and retransmission, the base station may time out, even though some UEs may not receive the transmission correctly. In such examples, the base station may decide to use MB or unicast transmissions based at least in part on a determination of which configuration would be most efficient, given retransmission delays for either MB or unicast, so that the UEs that would otherwise not receive a transmission successfully might receive the transmission. For example, if a unicast retransmission would be faster than an MB retransmission, in light of a timeout threshold, the base station may decide to use unicast for retransmission to reach more UEs before a timeout occurs.

Additionally or alternatively, if RLC and PDCP are not in the same network entity or are different network entities or devices, and if a base station receives an RLC status report, the base station may send the report back to a PDCP entity. The base station may send the report via a dynamic delegation discovery service (DDDS) message if RLC feedback is enabled, so that the PDCP entity will make the decision as to whether to use MB or unicast for retransmission.

Figure 7:
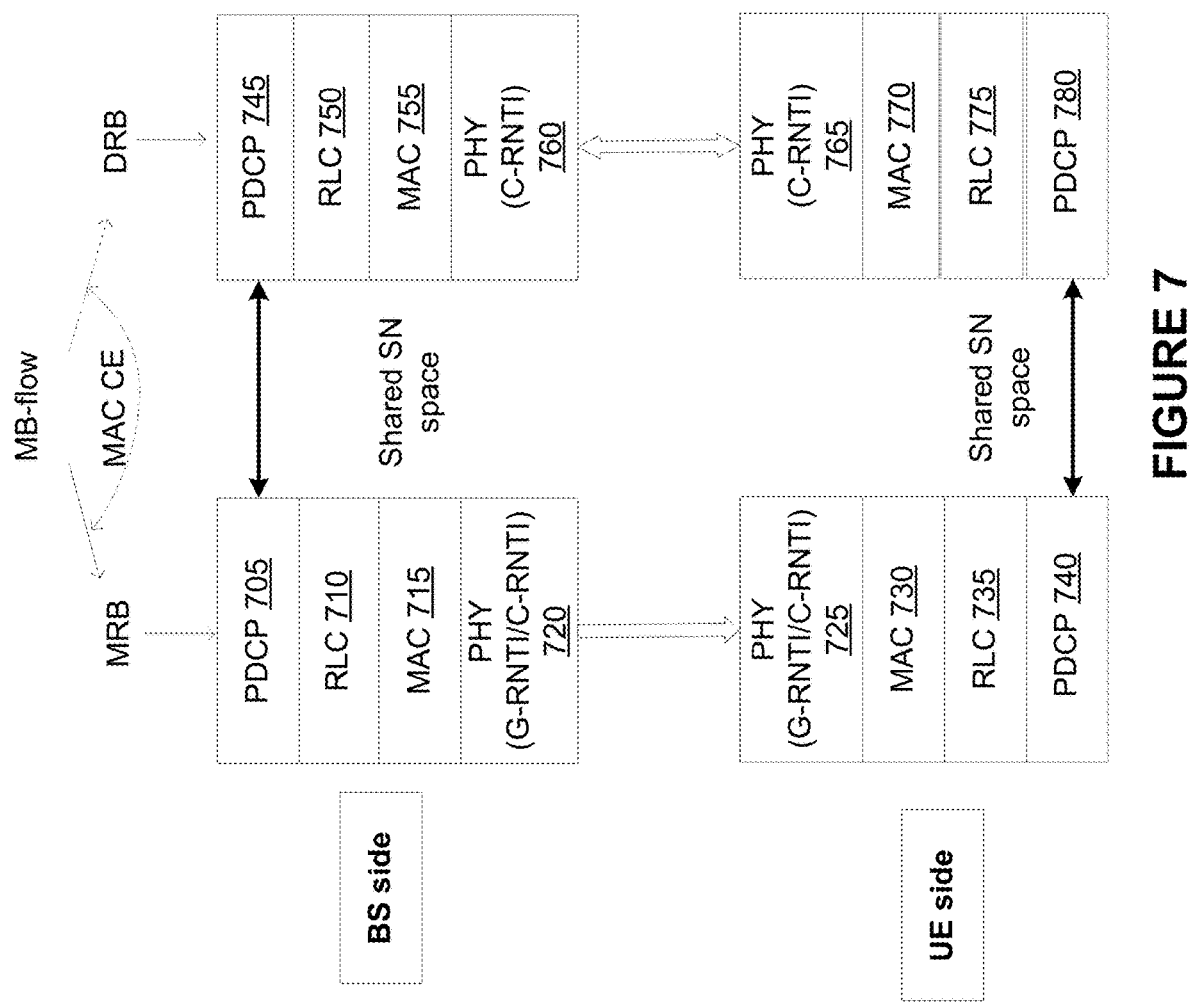
FIG. 7 illustrates network protocol layers for an MB-flow in a dual bearer mixed mode for coordination between MB communication and unicast communication in accordance with various aspects of the present disclosure.

FIG. 7 illustrates network protocol layers for an MB-flow in a dual bearer mixed mode for coordination between MB communication and unicast communication in accordance with various aspects of the present disclosure. In examples with CA or DC mixed modes, a base station may use a single MRB. However, in dual bearer mixed mode, the base station may decide to use an MRB or a DRB that may each may have all network protocol layers. For example, the MRB and the DRB may have separate PDCP layers 705 and 745, separate RLC layers 710 and 750, separate MAC layers 715 and 755, and separate physical layers 720 and 760 for the MB traffic and the unicast traffic. On a UE side, the MRB and the DRB may have separate physical layers 725 and 765, separate MAC layers 730 and 770, separate RLC layers 735 and 775, and separate PDCP layers 740 and 780 for the MB traffic and the unicast traffic.

In the dual bearer mixed mode, switching between an MRB and a DRB may be less dynamic than the CA mixed mode and the DC mixed mode. For a packet MB-flow, a base station may select to use an MRB or a DRB, such as to switch from the MRB to the DRB. The base station may signal this switch to a UE using a message with a MAC command element (CE) or a radio resource control (RRC) message. In such examples, using a MAC CE may be less complicated than using an RRC message, due to the structure of RRC. By signaling the switch to a UE, the UE may determine whether to monitor G-RNTI.

An MRB may be associated with a DRB. A base station may associate an MB-flow or QoS-flow, to a DRB, in a PDU session setup or modification process, and provide information identifying this association to a UE. Therefore, the UE may receive and store information identifying the association between an MRB and a DRB.

In some aspects, an MRB and a DRB may share the same PDCP sequence number (SN) space. The base station may assign the PDCP SN continuously in MRB/DRB switching. For example, the base station may switch from MRB to DRB but the PDCP SN may be continuous so that a UE may track duplication based at least in part on the PDCP SN. In such examples, a UE may share a PDCP SN space but not necessarily share a common PDCP protocol layer. The base station may use RRC signaling to configure which PDCP SN space the UE is to use. Using a shared PDCP SN space, the base station may maintain a continuation of PDCP SNs, and a UE may detect packet loss and track duplication based at least in part on the continuation of PDCP SNs in the shared PDCP SN space. The base station may configure the UE to monitor for the continuation of PDCP SNs in the shared PDCP SN space. Alternatively, the UE may have a common PDCP that is shared between the MRB and the DRB.

In some aspects, a PDCP SN space may be shared on a UE side but not a base station side. If a PDCP SN space is shared, a UE may operate similar to the DC mixed mode. In the DC mixed mode, the UE and the base station share a PDCP layer. In the MRB and DRB dual bearer mixed mode, it is possible for a PDCP layer to be shared at the UE but not the base station.

Figure 10:
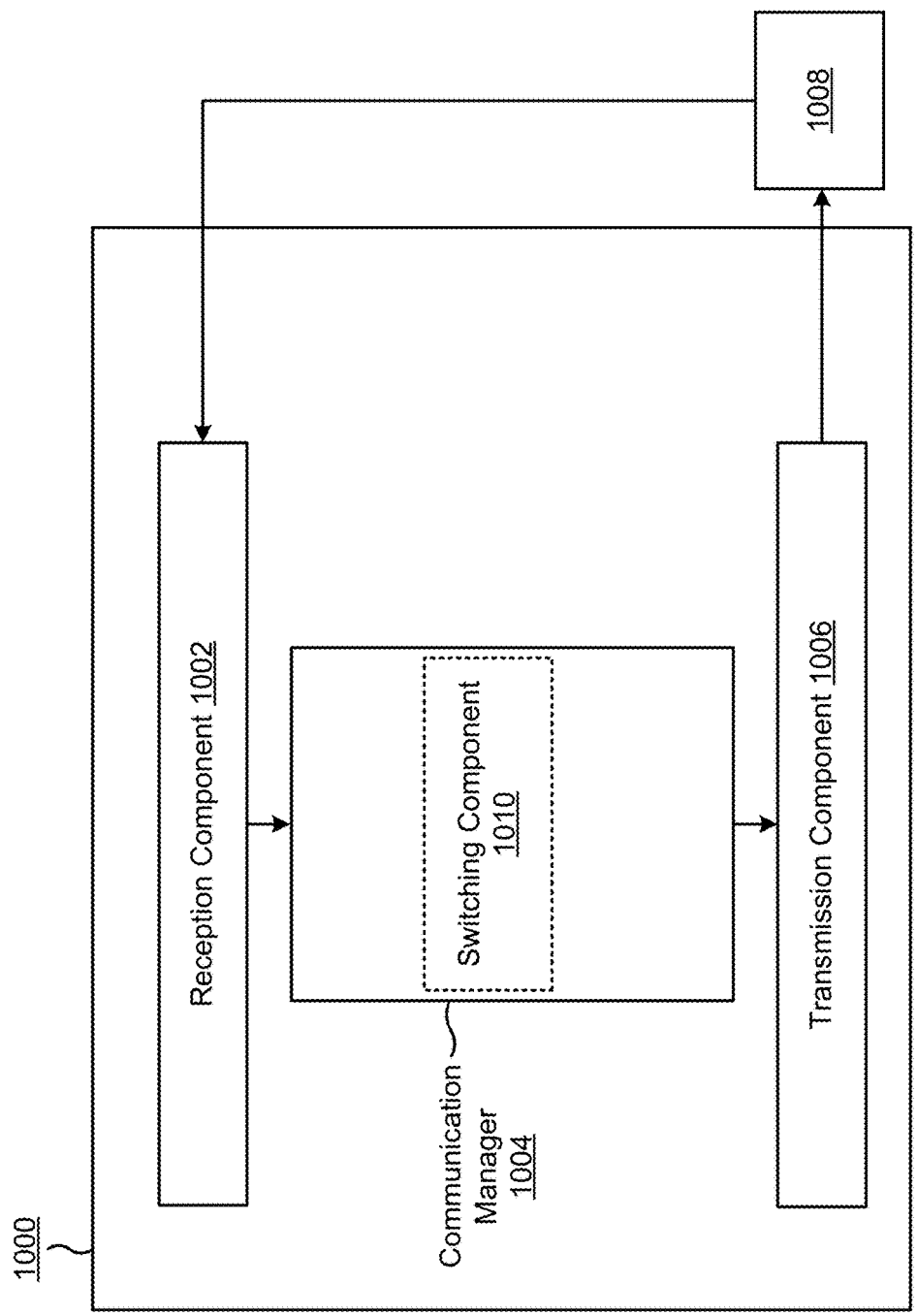
FIG. 10 is a block diagram of an example apparatus for wireless communication in accordance with various aspects of the present disclosure.

FIG. 10 is a block diagram of an example apparatus 1000 for wireless communication in accordance with various aspects of the present disclosure. The apparatus 1000 may be a UE, or a UE may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 4-7. Additionally or alternatively, the apparatus 1000 may be configured to perform one or more processes described herein, such as process 800 of FIG. 8. In some aspects, the apparatus 1000 may include one or more components of the UE described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the UE described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the UE described above in connection with FIG. 2. In some aspects, the transmission component 1006 may be co-located with the reception component 1002 in a transceiver.

The communication manager 1004 may receive or may cause the reception component 1002 to receive a configuration for a shared PDSCH. The communication manager 1004 may receive or may cause the reception component 1002 to receive a first communication via the shared PDSCH and a first bearer based at least in part on the configuration. The first communication may be one of a unicast communication or a multicast/broadcast communication. The communication manager 1004 may receive or may cause the reception component 1002 to receive a second communication via the shared PDSCH and the first bearer or a second bearer based at least in part on the configuration. The second communication may be the other of the unicast communication or the multicast/broadcast communication. The communication manager 1004 may transmit or may cause the transmission component 1006 to transmit uplink feedback, associated with at least one of the first communication or the second communication, using a cell radio network temporary identifier. In some aspects, the communication manager 1004 may include a controller/processor, a memory, or a combination thereof, of the UE described above in connection with FIG. 2.

In some aspects, the communication manager 1004 may include a set of components, such as a switching component 1010. Alternatively, the set of components may be separate and distinct from the communication manager 1004. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component. The switching component 1010 may switch between a unicast DRB and an MRB. Additionally or alternatively, the switching component 1010 may switch between MRBs via intra-MRB switching.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
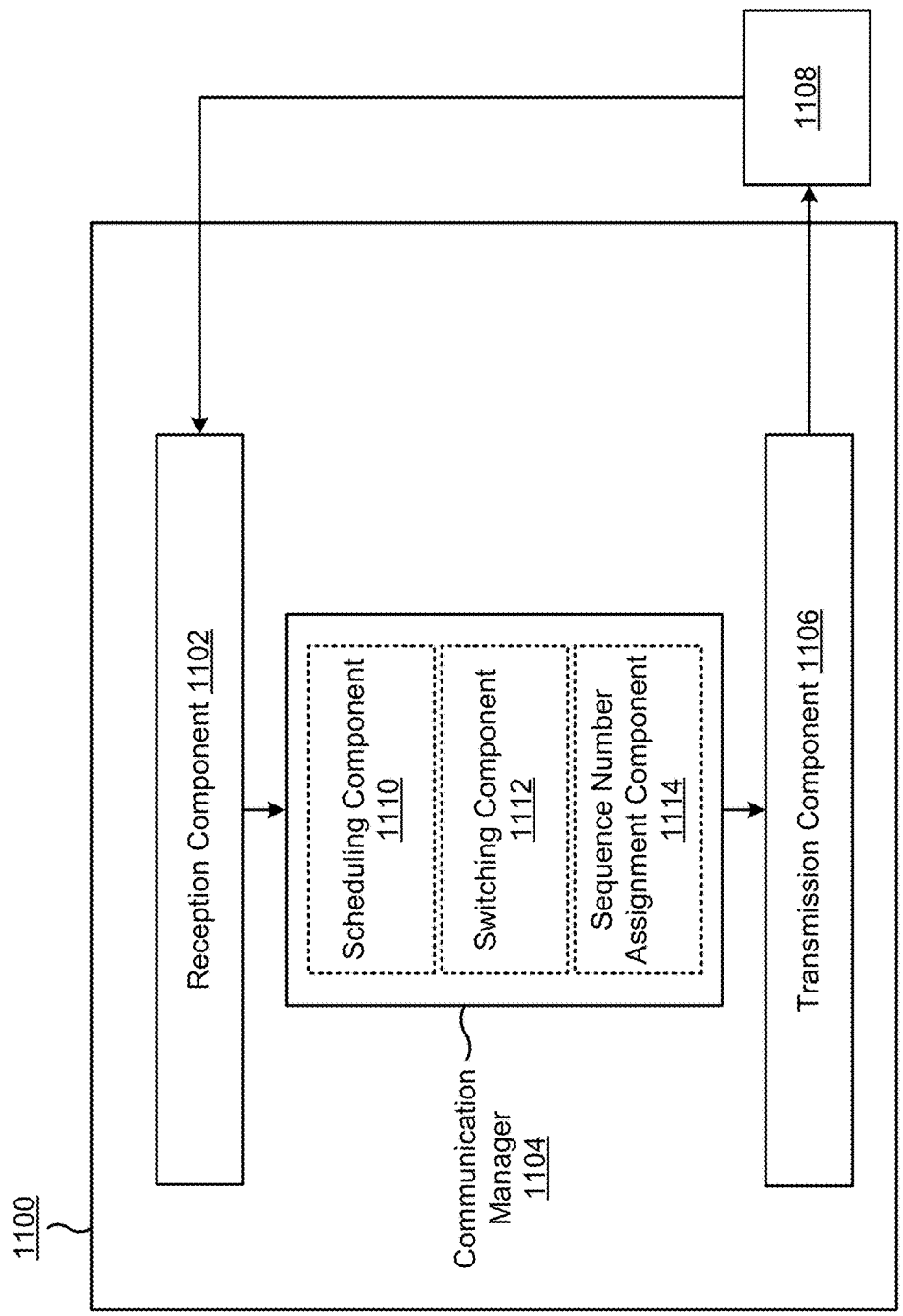
FIG. 11 is a block diagram of an example apparatus for wireless communication in accordance with various aspects of the present disclosure.

FIG. 11 is a block diagram of an example apparatus 1100 for wireless communication in accordance with various aspects of the present disclosure. The apparatus 1100 may be a base station, or a base station may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a UE, a base station, or another wireless communication device) using the reception component 1102 and the transmission component 1106.

In some aspects, the apparatus 1100 may be configured to perform one or more operations described herein in connection with FIGS. 4-7. Additionally or alternatively, the apparatus 1100 may be configured to perform one or more processes described herein, such as process 900 of FIG. 9. In some aspects, the apparatus 1100 may include one or more components of the base station described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the base station described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the base station described above in connection with FIG. 2. In some aspects, the transmission component 1106 may be co-located with the reception component 1102 in a transceiver.

The communication manager 1104 may transmit or may cause the transmission component 1106 to transmit a configuration for a shared PDSCH. The communication manager 1104 may transmit or may cause the transmission component 1106 to transmit a first communication via the shared PDSCH and a first bearer based at least in part on the configuration. The first communication may be one of a unicast communication or a multicast/broadcast communication. The communication manager 1104 may transmit or may cause the transmission component 1106 to transmit a second communication via the shared PDSCH and the first bearer or a second bearer based at least in part on the configuration. The second communication may be the other of the unicast communication or the multicast/broadcast communication. The communication manager 1104 may receive or may cause the reception component 1102 to receive uplink feedback, associated with at least one of the first communication or the second communication, using a cell radio network temporary identifier. The communication manager 1104 may transmit or may cause the transmission component 1106 to transmit a different configuration based at least in part on the uplink feedback. In some aspects, the communication manager 1104 may include a controller/processor, a memory, a scheduler, a communication unit, or a combination thereof, of the base station described above in connection with FIG. 2.

In some aspects, the communication manager 1104 may schedule or may cause the scheduling component 1110 to schedule packets (for example, on one or more layers, such as one or more physical layers or one or more radio link control layers). In some aspects, the communication manager 1104 may switch or may cause the switching component 1112 to switch between the first bearer and the second bearer. The first bearer may be one of an MRB or a DRB, and the second bearer may be the other of the MRB or the DRB. In some aspects, the communication manager 1104 may assign or may cause the sequence number assignment component 1114 to assign a sequence number, to a communication transmitted after the switching, that continues from a sequence number used for a communication transmitted before the switching.

In some aspects, the communication manager 1104 may include a set of components, such as a scheduling component 1110, a switching component 1112, a sequence number assignment component 1114, or a combination thereof. Alternatively, the set of components may be separate and distinct from the communication manager 1104. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The scheduling component 1110 may schedule packets (for example, on one or more layers, such as one or more physical layers or one or more radio link control layers). The switching component 1112 may switch between the first bearer and the second bearer. The first bearer may be one of an MRB or a DRB, and the second bearer may be the other of the MRB or the DRB. The sequence number assignment component 1114 may assign a sequence number, to a communication transmitted after the switching, that continues from a sequence number used for a communication transmitted before the switching.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 8:
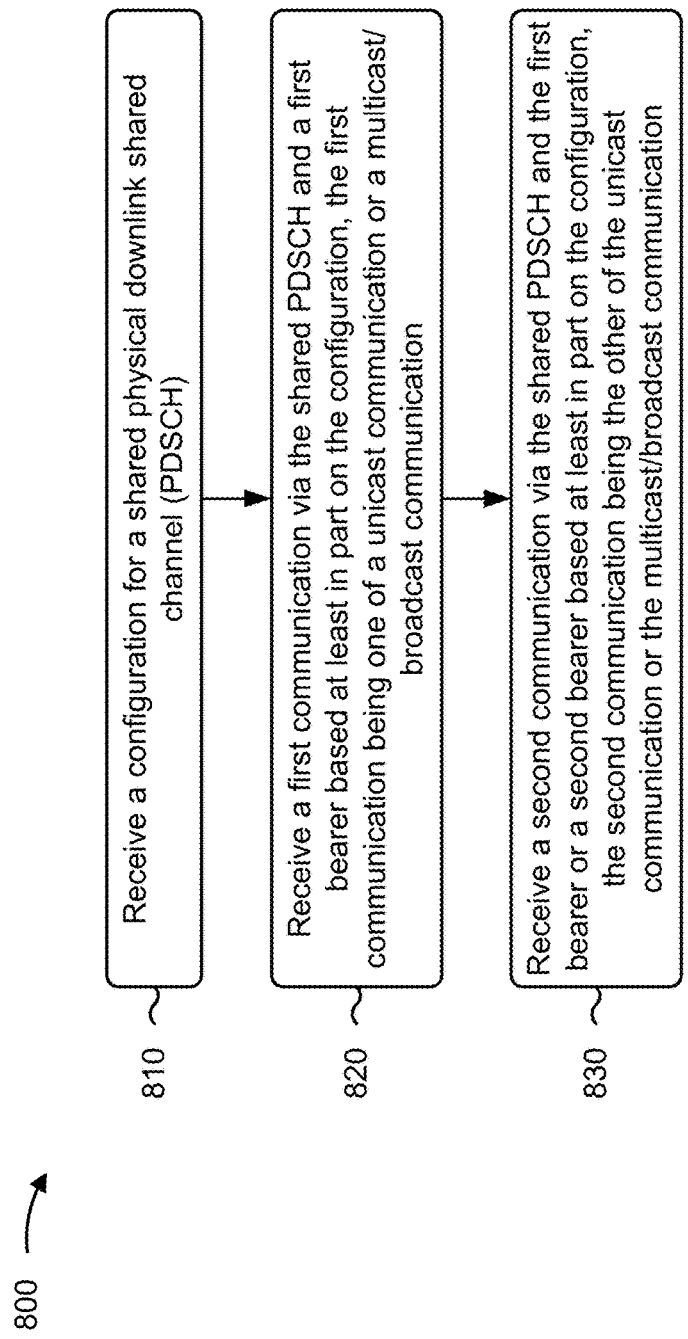
FIG. 8 is a flowchart illustrating an example process performed by a UE for coordination between MB communication and unicast communication in accordance with various aspects of the present disclosure.

FIG. 8 is a flowchart illustrating an example process 800 performed, for example, by a UE in accordance with various aspects of the present disclosure. Example process 800 is an example where the UE (for example, UE 120) performs operations associated with coordination between multicast/broadcast communication and unicast communication.

As shown in FIG. 8, in some aspects, process 800 may include receiving a configuration for a shared PDSCH (block 810). For example, the UE (such as by using reception component 1002, depicted in FIG. 10) may receive a configuration for a shared PDSCH, as described above.

As further shown in FIG. 8, in some aspects, process 800 may include receiving a first communication via the shared PDSCH and a first bearer based at least in part on the configuration, the first communication being one of a unicast communication or a multicast/broadcast communication (block 820). For example, the UE (such as by using reception component 1002, depicted in FIG. 10) may receive a first communication via the shared PDSCH and a first bearer based at least in part on the configuration, as described above. In some aspects, the first communication is one of a unicast communication or a multicast/broadcast communication.

As further shown in FIG. 8, in some aspects, process 800 may include receiving a second communication via the shared PDSCH and the first bearer or a second bearer based at least in part on the configuration, the second communication being the other of the unicast communication or the multicast/broadcast communication (block 830). For example, the UE (such as by using reception component 1002, depicted in FIG. 10) may receive a second communication via the shared PDSCH and the first bearer or a second bearer based at least in part on the configuration, as described above. In some aspects, the second communication is the other of the unicast communication or the multicast/broadcast communication.

Process 800 may include additional aspects, such as any single aspect or any combination of aspects described below or in connection with one or more other processes described elsewhere herein.

In a first additional aspect, the first bearer is an MRB and both the first communication and the second communication are received via the MRB.

In a second additional aspect, alone or in combination with the first aspect, the first bearer is one of an MRB or a dedicated radio bearer (DRB), the second bearer is the other of the MRB or the DRB, the first communication is received via the first bearer, and the second communication is received via the second bearer.

In a third additional aspect, alone or in combination with one or more of the first and second aspects, the configuration indicates a single packet data convergence protocol layer for both the multicast/broadcast communication and the unicast communication, a single radio link control layer for both the multicast/broadcast communication and the unicast communication, a single medium access control layer for both the multicast/broadcast communication and the unicast communication, a first physical layer for the multicast/broadcast communication, and a second physical layer for the unicast communication.

In a fourth additional aspect, alone or in combination with one or more of the first through third aspects, process 800 includes transmitting uplink feedback, associated with at least one of the first communication or the second communication, using a cell radio network temporary identifier.

In a fifth additional aspect, alone or in combination with one or more of the first through fourth aspects, the uplink feedback includes an identifier that identifies at least one of an MRB used for at least one of the first communication or the second communication, a group radio network temporary identifier associated with the MRB, a logical channel identifier associated with the MRB, or a combination thereof.

In a sixth additional aspect, alone or in combination with one or more of the first through fifth aspects, the configuration indicates a single packet data convergence protocol layer for both the multicast/broadcast communication and the unicast communication, a first radio link control layer associated with a first medium access control layer and a first physical layer for the multicast/broadcast communication, and a second radio link control layer associated with a second medium access control layer and a second physical layer for the unicast communication.

In a seventh additional aspect, alone or in combination with one or more of the first through sixth aspects, the configuration indicates separate packet data convergence protocol layers, separate radio link control layers, separate medium access control layers, and separate physical layers for the multicast/broadcast communication and the unicast communication.

In an eighth additional aspect, alone or in combination with one or more of the first through seventh aspects, a packet data convergence protocol sequence number space is shared between the first bearer and the second bearer, the first bearer is one of an MRB or a DRB, and the second bearer is the other of the MRB or the DRB.

In a ninth additional aspect, alone or in combination with one or more of the first through eighth aspects, the first communication is an initial transmission scrambled using a group radio network temporary identifier and the first bearer is an MRB, the second communication is a retransmission scrambled using a cell radio network temporary identifier and the second bearer is a DRB, and the retransmission has a different redundancy version than the initial transmission.

In a tenth additional aspect, alone or in combination with one or more of the first through ninth aspects, the first communication includes a base layer of a multi-layer video transmission and the second communication includes an enhancement layer of the multi-layer video transmission.

In an eleventh additional aspect, alone or in combination with one or more of the first through tenth aspects, a maximum data rate for the first bearer is based at least in part on a guaranteed bit rate associated with the first bearer.

In a twelfth additional aspect, alone or in combination with one or more of the first through eleventh aspects, a maximum combined data rate for the first bearer and the second bearer is based at least in part on a maximum bit rate associated with at least one of the first bearer or the second bearer.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
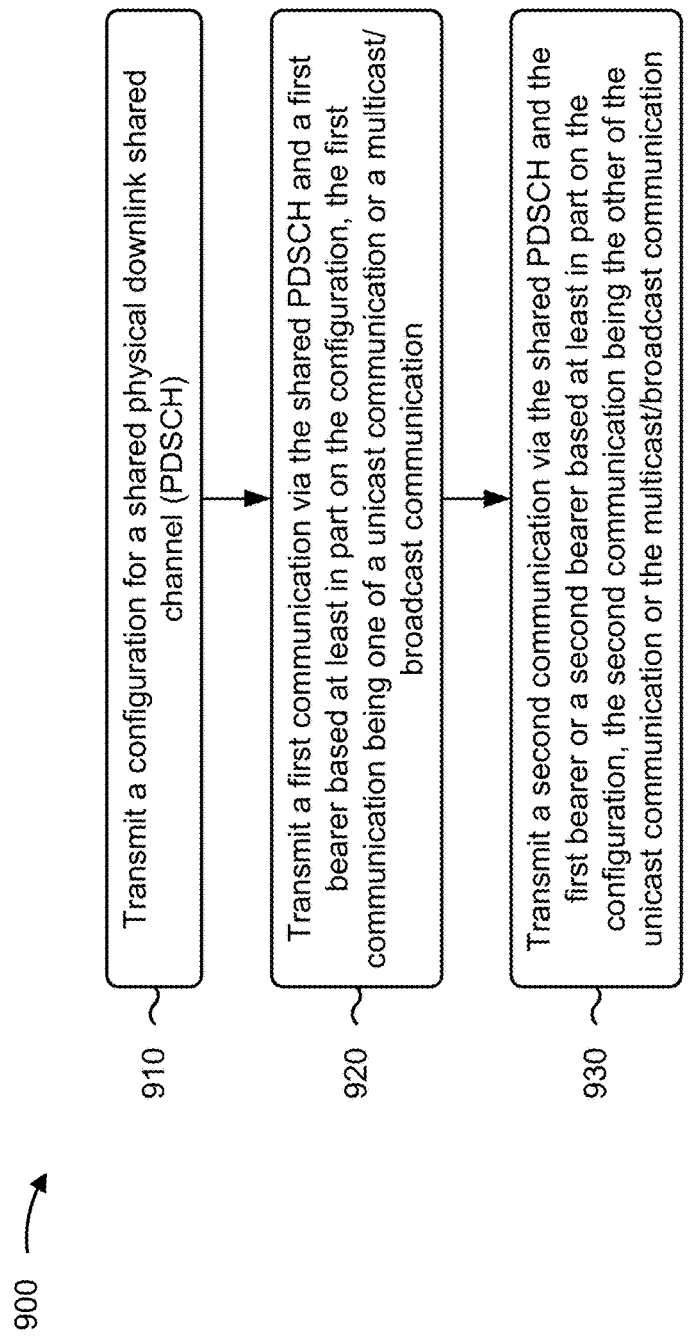
FIG. 9 is a flowchart illustrating an example process performed by a base station for coordination between MB communication and unicast communication in accordance with various aspects of the present disclosure.

FIG. 9 is a flowchart illustrating an example process 900 performed, for example, by a base station in accordance with various aspects of the present disclosure. Example process 900 is an example where the base station (for example, base station 110) performs operations associated with coordination between multicast/broadcast communication and unicast communication.

As shown in FIG. 9, in some aspects, process 900 may include transmitting a configuration for a shared PDSCH (block 910). For example, the base station (such as by using transmission component 1106, depicted in FIG. 11) may transmit a configuration for a shared PDSCH, as described above.

As further shown in FIG. 9, in some aspects, process 900 may include transmitting a first communication via the shared PDSCH and a first bearer based at least in part on the configuration, the first communication being one of a unicast communication or a multicast/broadcast communication (block 920). For example, the base station (such as by using transmission component 1106, depicted in FIG. 11) may transmit a first communication via the shared PDSCH and a first bearer based at least in part on the configuration, as described above. In some aspects, the first communication is one of a unicast communication or a multicast/broadcast communication.

As further shown in FIG. 9, in some aspects, process 900 may include transmitting a second communication via the shared PDSCH and the first bearer or a second bearer based at least in part on the configuration, the second communication being the other of the unicast communication or the multicast/broadcast communication (block 930). For example, the base station (such as by using transmission component 1106, depicted in FIG. 11) may transmit a second communication via the shared PDSCH and the first bearer or a second bearer based at least in part on the configuration, as described above. In some aspects, the second communication is the other of the unicast communication or the multicast/broadcast communication.

Process 900 may include additional aspects, such as any single aspect or any combination of aspects described below or in connection with one or more other processes described elsewhere herein.

In a first additional aspect, the first bearer is an MRB and both the first communication and the second communication are transmitted via the MRB.

In a second additional aspect, alone or in combination with the first aspect, the first bearer is one of an MRB or a DRB, the second bearer is the other of the MRB or the DRB, the first communication is transmitted via the first bearer, and the second communication is transmitted via the second bearer.

In a third additional aspect, alone or in combination with one or more of the first and second aspects, the configuration indicates a single packet data convergence protocol layer for both the multicast/broadcast communication and the unicast communication, a single radio link control layer for both the multicast/broadcast communication and the unicast communication, a single medium access control layer for both the multicast/broadcast communication and the unicast communication, a first physical layer for the multicast/broadcast communication, and a second physical layer for the unicast communication.

In a fourth additional aspect, alone or in combination with one or more of the first through third aspects, process 900 includes dynamically scheduling packets over the first physical layer, the second physical layer, or both.

In a fifth additional aspect, alone or in combination with one or more of the first through fourth aspects, process 900 includes transmitting a different configuration based at least in part on the uplink feedback.

In a sixth additional aspect, alone or in combination with one or more of the first through fifth aspects, the uplink feedback includes an identifier that identifies at least one of an MRB used for at least one of the first communication or the second communication, a group radio network temporary identifier associated with the MRB, a logical channel identifier associated with the MRB, or a combination thereof.

In a seventh additional aspect, alone or in combination with one or more of the first through sixth aspects, the configuration indicates a single packet data convergence protocol layer for both the multicast/broadcast communication and the unicast communication, a first radio link control layer associated with a first medium access control layer and a first physical layer for the multicast/broadcast communication, and a second radio link control layer associated with a second medium access control layer and a second physical layer for the unicast communication.

In an eighth additional aspect, alone or in combination with one or more of the first through seventh aspects, process 900 includes dynamically scheduling packets over the first radio link control layer, the second radio link control layer, or both.

In a ninth additional aspect, alone or in combination with one or more of the first through eighth aspects, the configuration indicates separate packet data convergence protocol layers, separate radio link control layers, separate medium access control layers, and separate physical layers for the multicast/broadcast communication and the unicast communication.

In a tenth additional aspect, alone or in combination with one or more of the first through ninth aspects, a packet data convergence protocol sequence number space is shared between the first bearer and the second bearer, the first bearer is one of an MRB or a DRB, and the second bearer is the other of the MRB or the DRB.

In an eleventh additional aspect, alone or in combination with one or more of the first through tenth aspects, process 900 includes dynamically switching between the first bearer and the second bearer, the first bearer is one of an MRB or a DRB, and the second bearer is the other of the MRB or the DRB.

In a twelfth additional aspect, alone or in combination with one or more of the first through eleventh aspects, process 900 includes assigning a sequence number, to a communication transmitted after the switching, that continues from a sequence number used for a communication transmitted before the switching.

In a thirteenth additional aspect, alone or in combination with one or more of the first through twelfth aspects, the first communication is an initial transmission scrambled using a group radio network temporary identifier and the first bearer is an MRB, the second communication is a retransmission scrambled using a cell radio network temporary identifier and the second bearer is a DRB, and the retransmission has a different redundancy version than the initial transmission.

In a fourteenth additional aspect, alone or in combination with one or more of the first through thirteenth aspects, the first communication includes a base layer of a multi-layer video transmission and the second communication includes an enhancement layer of the multi-layer video transmission.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold among other examples, or combinations thereof.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items among other examples, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a configuration for a shared physical downlink shared channel (PDSCH), wherein the configuration indicates a single packet data convergence protocol layer for both a multicast/broadcast communication and a unicast communication, a first radio link control layer associated with a first medium access control layer and a first physical layer for the multicast/broadcast communication, and a second radio link control layer associated with a second medium access control layer and a second physical layer for the unicast communication;
   receiving a first communication via the shared PDSCH and a first bearer based at least in part on the configuration, the first communication being one of the unicast communication or the multicast/broadcast communication; and
   receiving a second communication via the shared PDSCH and the first bearer or a second bearer based at least in part on the configuration, the second communication being the other of the unicast communication or the multicast/broadcast communication.

2. The method of claim 1, wherein the first bearer is a multicast broadcast radio bearer (MRB) and both the first communication and the second communication are received via the MRB.

3. The method of claim 1, wherein the first bearer is one of a multicast broadcast radio bearer (MRB) or a dedicated radio bearer (DRB), the second bearer is the other of the MRB or the DRB, the first communication is received via the first bearer, and the second communication is received via the second bearer.

4. The method of claim 1, further comprising:
   receiving another configuration for the shared PDSCH, wherein the other configuration indicates the single packet data convergence protocol layer for both the multicast/broadcast communication and the unicast communication, a single radio link control layer for both the multicast/broadcast communication and the unicast communication, a single medium access control layer for both the multicast/broadcast communication and the unicast communication, the first physical layer for the multicast/broadcast communication, and the second physical layer for the unicast communication; and
   receiving a third communication via the shared PDSCH based at least in part on the other configuration.

5. The method of claim 1, further comprising transmitting uplink feedback, associated with at least one of the first communication or the second communication, using a cell radio network temporary identifier.

6. The method of claim 5, wherein the uplink feedback includes an identifier that identifies at least one of: a multicast broadcast radio bearer (MRB) used for at least one of the first communication or the second communication, a group radio network temporary identifier associated with the MRB, or a logical channel identifier associated with the MRB.

7. The method of claim 1, further comprising:
receiving another configuration for the shared PDSCH, wherein the other configuration indicates separate packet data convergence protocol layers, separate radio link control layers, separate medium access control layers, and separate physical layers for the multicast/broadcast communication and the unicast communication; and
receiving a third communication via the shared PDSCH based at least in part on the other configuration.

8. The method of claim 7, wherein, for the other configuration, a packet data convergence protocol sequence number space is shared between the first bearer and the second bearer, wherein the first bearer is one of a multicast broadcast radio bearer (MRB) or a dedicated radio bearer (DRB), and wherein the second bearer is the other of the MRB or the DRB.

9. The method of claim 1, wherein the first communication is an initial transmission scrambled using a group radio network temporary identifier and the first bearer is a multicast broadcast radio bearer (MRB), and wherein the second communication is a retransmission scrambled using a cell radio network temporary identifier and the second bearer is a dedicated radio bearer (DRB), wherein the retransmission has a different redundancy version than the initial transmission.

10. The method of claim 1, wherein the first communication includes a base layer of a multi-layer video transmission and the second communication includes an enhancement layer of the multi-layer video transmission.

11. The method of claim 1, wherein a maximum data rate for the first bearer is based at least in part on a guaranteed bit rate associated with the first bearer.

12. The method of claim 1, wherein a maximum combined data rate for the first bearer and the second bearer is based at least in part on a maximum bit rate associated with at least one of the first bearer or the second bearer.

13. A method of wireless communication performed by a network entity, comprising:
transmitting a configuration for a shared physical downlink shared channel (PDSCH), wherein the configuration indicates a single packet data convergence protocol layer for both a multicast/broadcast communication and a unicast communication, a first radio link control layer associated with a first medium access control layer and a first physical layer for the multicast/broadcast communication, and a second radio link control layer associated with a second medium access control layer and a second physical layer for the unicast communication;
transmitting a first communication via the shared PDSCH and a first bearer based at least in part on the configuration, the first communication being one of the unicast communication or the multicast/broadcast communication; and
transmitting a second communication via the shared PDSCH and the first bearer or a second bearer based at least in part on the configuration, the second communication being the other of the unicast communication or the multicast/broadcast communication.

14. The method of claim 13, wherein the first bearer is a multicast broadcast radio bearer (MRB) and both the first communication and the second communication are transmitted via the MRB.

15. The method of claim 13, wherein the first bearer is one of a multicast broadcast radio bearer (MRB) or a dedicated radio bearer (DRB), the second bearer is the other of the MRB or the DRB, the first communication is transmitted via the first bearer, and the second communication is transmitted via the second bearer.

16. The method of claim 13, further comprising:
transmitting another configuration for the shared PDSCH, wherein the other configuration indicates the single packet data convergence protocol layer for both the multicast/broadcast communication and the unicast communication, a single radio link control layer for both the multicast/broadcast communication and the unicast communication, a single medium access control layer for both the multicast/broadcast communication and the unicast communication, the first physical layer for the multicast/broadcast communication, and the second physical layer for the unicast communication; and
transmitting a third communication via the shared PDSCH based at least in part on the other configuration.

17. The method of claim 16, further comprising dynamically scheduling packets over the first physical layer, the second physical layer, or both.

18. The method of claim 13, further comprising:
receiving uplink feedback, associated with at least one of the first communication or the second communication, using a cell radio network temporary identifier; and
transmitting a different configuration based at least in part on the uplink feedback.

19. The method of claim 18, wherein the uplink feedback includes an identifier that identifies at least one of: a multicast broadcast radio bearer (MRB) used for at least one of the first communication or the second communication, a group radio network temporary identifier associated with the MRB, or a logical channel identifier associated with the MRB, or a combination thereof.

20. The method of claim 13, further comprising dynamically scheduling packets over the first radio link control layer, the second radio link control layer, or both.

21. The method of claim 13, further comprising:
transmitting another configuration for the shared PDSCH, wherein the other configuration indicates separate packet data convergence protocol layers, separate radio link control layers, separate medium access control layers, and separate physical layers for the multicast/broadcast communication and the unicast communication; and
transmitting a third communication via the shared PDSCH based at least in part on the other configuration.

22. The method of claim 21, wherein, for the other configuration, a packet data convergence protocol sequence number space is shared between the first bearer and the second bearer, wherein the first bearer is one of a multicast broadcast radio bearer (MRB) or a dedicated radio bearer (DRB), and wherein the second bearer is the other of the MRB or the DRB.

23. The method of claim 21, further comprising dynamically switching between the first bearer and the second bearer, wherein the first bearer is one of a multicast broadcast radio bearer (MRB) or a dedicated radio bearer (DRB), and wherein the second bearer is the other of the MRB or the DRB.

24. The method of claim 23, further comprising assigning a sequence number, to a communication transmitted after the switching, that continues from a sequence number used for a communication transmitted before the switching.

25. The method of claim 13, wherein the first communication is an initial transmission scrambled using a group radio network temporary identifier and the first bearer is a multicast broadcast radio bearer (MRB), and wherein the second communication is a retransmission scrambled using a cell radio network temporary identifier and the second bearer is a dedicated radio bearer (DRB), wherein the retransmission has a different redundancy version than the initial transmission.

26. The method of claim 13, wherein the first communication includes a base layer of a multi-layer video transmission and the second communication includes an enhancement layer of the multi-layer video transmission.

27. A user equipment (UE) for wireless communication, comprising:
a memory; and
one or more processors coupled to the memory, the one or more processors configured to:
receive a configuration for a shared physical downlink shared channel (PDSCH), wherein the configuration indicates a single packet data convergence protocol layer for both a multicast/broadcast communication and a unicast communication, a first radio link control layer associated with a first medium access control layer and a first physical layer for the multicast/broadcast communication, and a second radio link control layer associated with a second medium access control layer and a second physical layer for the unicast communication;
receive a first communication via the shared PDSCH and a first bearer based at least in part on the configuration, the first communication being one of the unicast communication or the multicast/broadcast communication; and
receive a second communication via the shared PDSCH and the first bearer or a second bearer based at least in part on the configuration, the second communication being the other of the unicast communication or the multicast/broadcast communication.

28. The UE of claim 27, wherein the one or more processors are further configured to:
receive another configuration for the shared PDSCH, wherein the other configuration indicates the single packet data convergence protocol layer for both the multicast/broadcast communication and the unicast communication, a single radio link control layer for both the multicast/broadcast communication and the unicast communication, a single medium access control layer for both the multicast/broadcast communication and the unicast communication, the first physical layer for the multicast/broadcast communication, and the second physical layer for the unicast communication; and
receive a third communication via the shared PDSCH based at least in part on the other configuration.

29. The UE of claim 27, wherein the one or more processors are further configured to transmit uplink feedback, associated with at least one of the first communication or the second communication, using a cell radio network temporary identifier.

30. A network entity for wireless communication, comprising:
a memory; and
one or more processors coupled to the memory, the one or more processors configured to:
transmit a configuration for a shared physical downlink shared channel (PDSCH), wherein the configuration indicates a single packet data convergence protocol layer for both a multicast/broadcast communication and a unicast communication, a first radio link control layer associated with a first medium access control layer and a first physical layer for the multicast/broadcast communication, and a second radio link control layer associated with a second medium access control layer and a second physical layer for the unicast communication;
transmit a first communication via the shared PDSCH and a first bearer based at least in part on the configuration, the first communication being one of the unicast communication or the multicast/broadcast communication; and
transmit a second communication via the shared PDSCH and the first bearer or a second bearer based at least in part on the configuration, the second communication being the other of the unicast communication or the multicast/broadcast communication.

* * * * *